United States Patent [19]

Takeishi et al.

[11] Patent Number: 5,006,251

[45] Date of Patent: Apr. 9, 1991

[54] PROCESS FOR TREATING ORGANIC WASTE WATER

[75] Inventors: Kazuo Takeishi, Ibaraki; Yasuhiro Okubo; Takashi Itoh, both of Tokyo, all of Japan

[73] Assignees: Director General, Public Works Research Institute, Ministry of Construction, Ibaraki; Nishihara Environmental Sanitation Research Corporation Limited, Tokyo, both of Japan

[21] Appl. No.: 413,188

[22] Filed: Sep. 27, 1989

[51] Int. Cl.$^5$ .............................................. C02F 3/06
[52] U.S. Cl. .................................. 210/618; 210/621; 210/631
[58] Field of Search ........ 210/617, 618, 631, 620–622, 210/793

[56] References Cited

U.S. PATENT DOCUMENTS

| | | | |
|---|---|---|---|
| 3,928,190 | 12/1975 | Bebin | 210/618 |
| 4,053,396 | 10/1977 | Trense et al. | 210/618 |
| 4,568,463 | 2/1986 | Klein | 210/618 X |
| 4,743,376 | 5/1988 | Elmaleh et al. | 210/617 |

Primary Examiner—Tom Wyse
Attorney, Agent, or Firm—Whitham & Marhoefer

[57] ABSTRACT

A process for treating organic waste water in which a first step provided at the stage precedent to a second step using an aerobic filter bed employs an upward flow type solid-liquid separator packed with a filter medium, with the SS (suspended solids) removal at the preceding stage being performed at a high SS removal rate and in a short time.

5 Claims, 1 Drawing Sheet

PROCESS FOR TREATING ORGANIC WASTE WATER

BACKGROUND OF THE INVENTION

1. Field of the Invention

This invention relates to a process for treating organic waste water by which to perform efficient treatment of organic waste water containing SS (suspended solids).

2. Description of the Prior Art

As a method of treating SS-containing organic waste water, there has been hitherto known a method in which, as shown in FIG. 1, an immersion type aerobic filter bed 100 packed with a granular filter medium is used.

In the figure, the immersion type aerobic filter bed 100 is packed with the filter medium 101. A diffuser pipe 102 for supplying air is disposed on the lower side of the filter medium 101.

Raw water, or waste water to be treated, is introduced into the immersion type filter bed 100 via an upper portion of the filter bed. While passing through the filter medium 101, the raw water is aerated by air supplied from the diffuser pipe 102, resulting in an aerobic treatment. Meanwhile, the SS are caught by the filter medium 101. The thus treated water is discharged to the exterior of the filter bed.

The immersion type aerobic filter bed method according to the prior art is extremely effective for the treatment of waste water which has a low SS content. For organic waste water having a high SS concentration such as raw sewage water, however, the conventional aerobic filter bed method is not capable of displaying a satisfactory treating function because of clogging of the filter medium 101 used in the immersion type aerobic filter bed 100, a lowering in the filtering function for the SS, and so on.

Therefore, it has been a common practice, as shown in FIG. 1, to provide a sedimentation basin 103 at the stage precedent to the immersion type aerobic filter bed 100 so as to preliminarily remove the SS to a predetermined level.

The sedimentation method, however, involves the problem that because of not so high an SS removal rate, it is impossible to obviate satisfactorily the clogging of the immersion type aerobic filter bed 100, together with the problems of a long treating time and a poor efficiency. In addition, the sedimentation basin 103 is large in size and requires a large installation space.

SUMMARY OF THE INVENTION

This invention contemplates overcoming the above-mentioned problems involved in the prior art.

It is an object of this invention to provide a process for treating organic waste water which enables a remarkable enhancement of the SS removal performance at the preceding stage.

According to this invention, there is provided a process for treating organic waste water in which a first step for removal of SS at high efficiency by use of an upward flow type solid-liquid separator packed with a filter medium is provided at the stage precedent to a second step for an aerobic treatment by use of an aerobic filter bed packed with a granular filter medium.

The above and other objects, features and advantages of this invention will become apparent from the following description and appended claims, taken in conjunction with the accompanying drawings.

PREFERRED EMBODIMENT OF THE INVENTION

Figure 1:
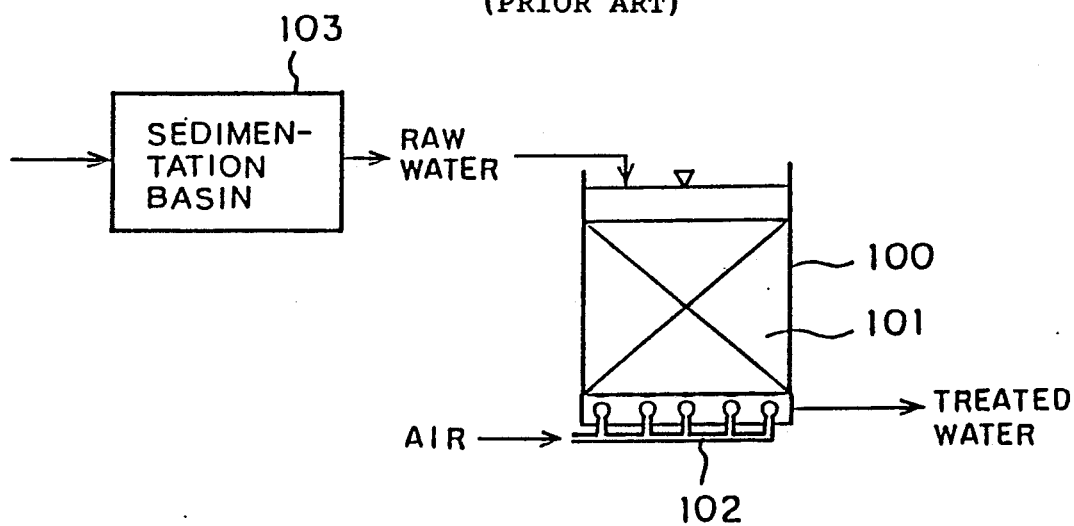
FIG. 1 is a flow sheet showing an immersion type aerobic filter bed method according to the prior art.

One embodiment of this invention will now be described below while referring to the drawings.

Figure 2:
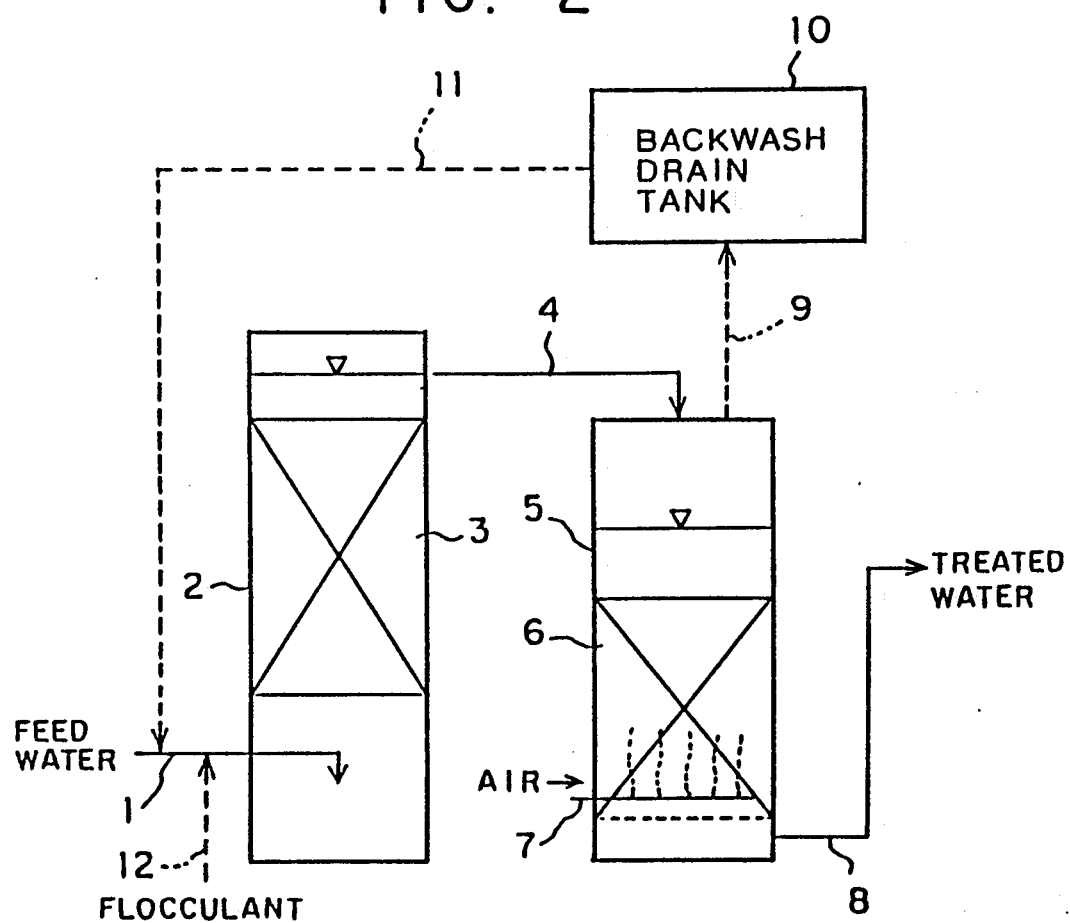
FIG. 2 is a flow sheet showing one embodiment of this invention.

The process according to this invention comprises a first step for efficient removal of SS. In the first step, as shown in FIG. 2, SS-containing organic waste water, as raw water, is introduced via an inlet pipe 1 into a lower portion of a solid-liquid separator 2. The raw water thus introduced flows upward through the voids in a filter medium 3 packed in the separator 2, and is discharged from an upper portion of the separator 2 through an outlet pipe 4. During the flow of the raw water through the separator 2, the SS are removed by the filter medium 3 speedily and efficiently.

The process according to this invention comprises a second step. In the second step, the effluent water discharged via the outlet pipe 4 from the first step is introduced into an aerobic filter bed 5 via an upper portion of the filter bed. The water thus introduced is passed downward through the voids in a granular filter medium 6 packed in the filter bed 5, while being aerated by air supplied into a lower portion of the filter bed 5 through a diffuser pipe 7, resulting in an aerobic treatment. The water thus treated aerobically is discharged from the filter bed 5 via an outlet pipe 8.

It is important that the filter medium 3 packed in the solid-liquid separator 2 used in the first step has a high void ratio, desirably a void ratio of at least 70%. With the high void ratio, it is possible to maintain a low linear velocity of the water flowing through the voids in the filter medium. Besides, since the SS are caught in a three-dimensional manner throughout the filter medium layer, it is possible to achieve a higher SS removal rate and a higher SS retention. It is desirable that the specific gravity of the filter medium 3 be around 1.0, preferably in the range of 0.9 to 1.0. With such a specific gravity, the filter medium 3 is capable of easy fluidization at the time of washing thereof, ensuring easy separation of the caught SS and easy discharge of the separated SS. The filter medium 3 desirably has a small cylindrical shape with the surface corrugated or provided with whisker-like protrusions for easy capture of the SS. The small cylindrical filter medium form numerous minite spaces in the filter medium layer, each of the minute spaces functioning as a core for sedimentation separation.

The aerobic filter bed 5 packed with the granular filter medium 6 used in the second step serves for carrying out both BOD removal and SS filtration simultaneously. If waste water with high SS concentration is treated directly by the aerobic filter bed 5, clogging of the filter bed may occur in a short time, or the filtering function may be lowered, resulting in a poor treating function. When most part of the SS is removed in the first step, on the other hand, an excellent treating function is achieved, and the need for a final sedimentation basin is eliminated.

Backwash drainage and backwash sludge discharged from an upper portion of the aerobic filter bed 5 through a backwash drain pipe 9 are reserved in a backwash drain tank 10. A portion or the whole of the backwash drainage and backwash sludge be returned through a backwash drainage return pipe 11 to the raw water feed side of the first step, and is mixed with the raw water, to be introduced into the lower portion of the solid-liquid separator 2. This ensures that organic matter is adsorbed on the biological sludge in the backwash drainage, and is separated and removed in the first step. Thus, a further higher effect is expected.

If required, a flocculant may be additionally supplied on the raw water feed side of the first step through a flocculant feed pipe 12. This enables a further enhancement of the SS removal rate in the first step.

One experimental example will now be explained.

A treatment of raw sewage was carried out according to the flow sheet shown in FIG. 2. As the filter medium in the solid-liquid separator, a plastic-made small cylindrical filter medium, 21 mm in diameter and 21 mm in length, with the surface corrugated, was packed to a layer height of 1.3 m. The treatment was conducted in an upward flow system. The effluent from the solid-liquid separator was treated in a downward flow system by an aerobic filter bed packed with a granular filter medium of 3 to 8 mm grain diameter to a layer height of 1.8 to 2.0 m. The water thus treated had the properties as given in Table 1, which shows that a final sedimentation basin is unnecessary.

As a support layer for the granular filter medium, crushed stone or gravel of 10 to 40 mm grain diameter was packed in the aerobic filter bed to a height of about 0.2 to 0.3 m. The granular filter medium is preferably obtained by sintering expanded shale or chamotte into a granular shape, and preferably has an apparent specific gravity of about 1.3 to 1.6. Further, the granular filter medium may be formed of a plastic, activated carbon or the like.

TABLE 1

|  | Waste water | Effluent from first step | Effluent from second step (treated water) |
|---|---|---|---|
| SS (mg/l) | 200–300 | 40–60 | 2–6 |
| BOD (mg/l) | 180–260 | 70–90 | 3–8 |
| COD (mg/l) | 80–160 | 40–60 | 10–20 |

The treating time was 1.0 to 1.5 Hr for the first step, 0.8 to 1.5 Hr for the second step, and 2.0 to 3.0 Hr in total. Thus, a marked reduction in treating time was achieved, as compared with the standard activated sludge method according to the prior art.

TABLE 2

| Method of treatment | Total dwell time |
|---|---|
| Standard activated sludge method | 10–13 Hr |
| Process of this invention | 2–3 Hr |

As has been described above, the process for treating organic waste water according to this invention uses a combination of an upward flow type solid-liquid separator packed with a filter medium and an aerobic filter bed packed with a granular filter medium, which enables a remarkably compacter total design of the treating system.

Besides, the solid-liquid separator at the preceding stage has a high SS removal rate, so that the aerobic filter bed will not be clogged, the treating function will be stable, and the range of application of the system is broadened, according to this invention.

Further, the solid-liquid separator at the preceding stage removes the SS speedily and efficiently, leading to a further enhanced total treating capability.

Moreover, since the aerobic filter bed packed with the granular filter medium is employed at the subsequent stage, the need for a final sedimentation basin is eliminated, resulting in easier maintenance of the system.

We claim:

1. A process for treating organic waste water which comprises a first step of introducing the organic waste water containing suspended solids into a solid-liquid separator packed with a filter medium having a void ratio of at least 70%, via a lower portion of the separator, and discharging the waste water from the separator via an upper portion of the separator to thereby remove the suspended solids from the waste water, and a second step of introducing the effluent from the first step into an aerobic filter bed packed with a granular filter medium and supplied with oxygen-containing gas from a lower portion of the filter medium-packed bed, via an upper portion of the filter bed, and discharging the effluent from the filter bed via a lower portion of the filter bed to thereby treat the effluent aerobically.

2. The process as set forth in claim 1, wherein the void ratio of the filter medium used in the first step is at least 85%.

3. The process as set forth in claim 1, wherein the specific gravity of the filter medium used in the first step is 0.9 to 1.0.

4. The process as set forth in claim 2, wherein a portion or the whole of backwash drainage discharged from the aerobic filter bed used in the second step is returned to the inlet side of the first step.

5. The process as set forth in claim 1, wherein a flocculant is additionally provided on the inlet side of the first step.

* * * * *